(12) United States Patent
Fleming et al.

(10) Patent No.: US 7,906,878 B2
(45) Date of Patent: Mar. 15, 2011

(54) COOLING ASSEMBLY FOR LARGE DIAMETER ELECTRIC MACHINES

(75) Inventors: Steve Fleming, Boucherville (CA); George Bursuc, Brossard (CA); Bruno Carpentier, St-Basile-le-Grand (CA)

(73) Assignee: TM4 Inc., Quebec (CA)

( * ) Notice: Subject to any disclaimer, the term of this patent is extended or adjusted under 35 U.S.C. 154(b) by 326 days.

(21) Appl. No.: 12/255,309

(22) Filed: Oct. 21, 2008

(65) Prior Publication Data
US 2009/0115268 A1    May 7, 2009

Related U.S. Application Data

(60) Provisional application No. 60/996,194, filed on Nov. 6, 2007.

(51) Int. Cl.
*H02K 9/00* (2006.01)

(52) U.S. Cl. .................. 310/52; 310/54; 310/216.119
(58) Field of Classification Search ........... 310/216.119, 310/52, 54, 58, 64, 60 A
See application file for complete search history.

(56) References Cited

U.S. PATENT DOCUMENTS

| | | | |
|---|---|---|---|
| 7,474,021 B2* | 1/2009 | Perrin | 310/52 |
| 7,635,932 B2* | 12/2009 | Matin et al. | 310/58 |
| 2005/0116553 A1* | 6/2005 | Poulin et al. | 310/54 |

* cited by examiner

*Primary Examiner* — Quyen Leung
*Assistant Examiner* — Naishadh N Desai
(74) *Attorney, Agent, or Firm* — Fay Kaplun & Marcin, LLP

(57) ABSTRACT

A cooling assembly to be positioned inside an internal stator of an electric machine is described herein. The cooling assembly includes a plurality of cooling segments that may be so mounted to a support structure as to be biased towards an inner surface of the stator.

13 Claims, 5 Drawing Sheets

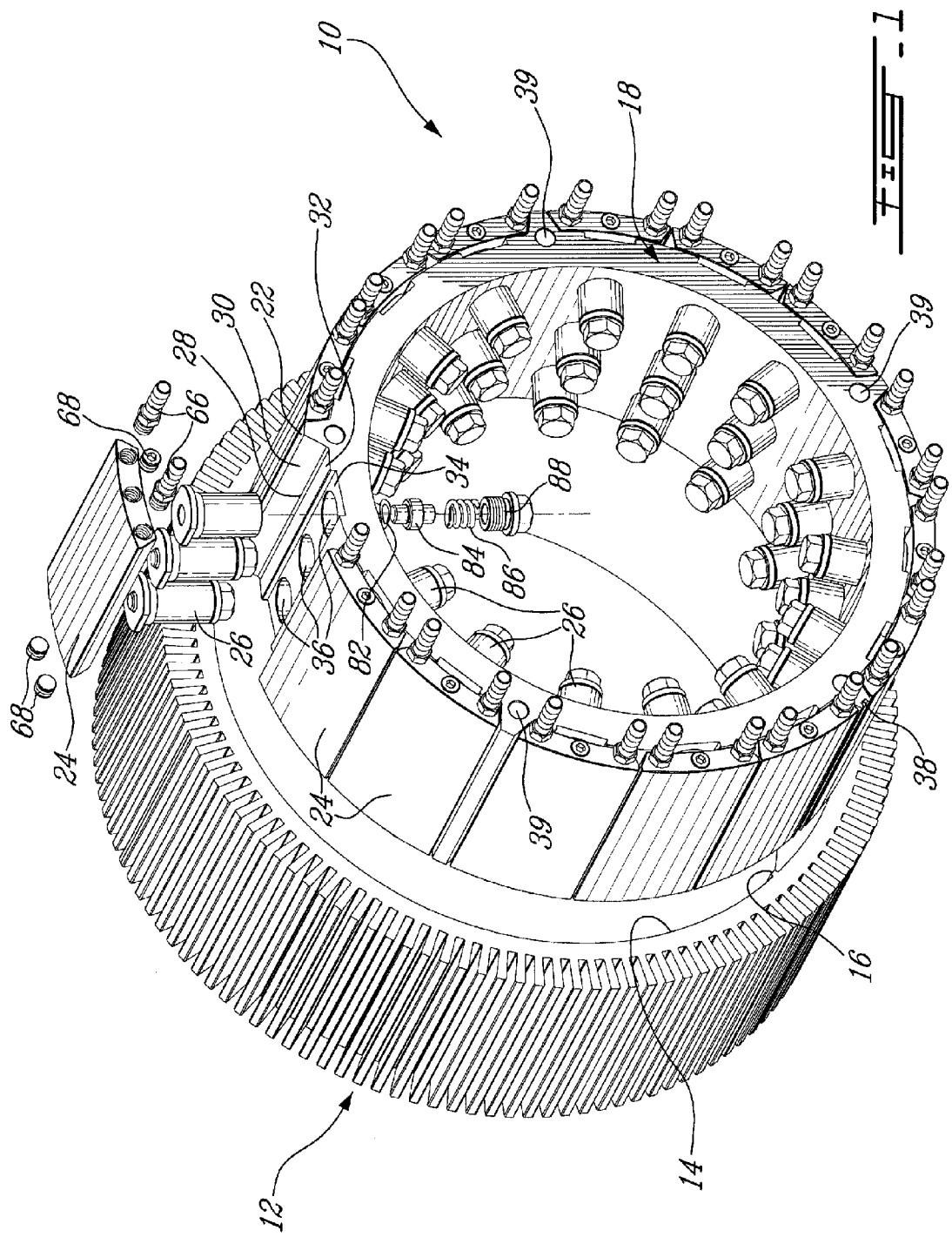

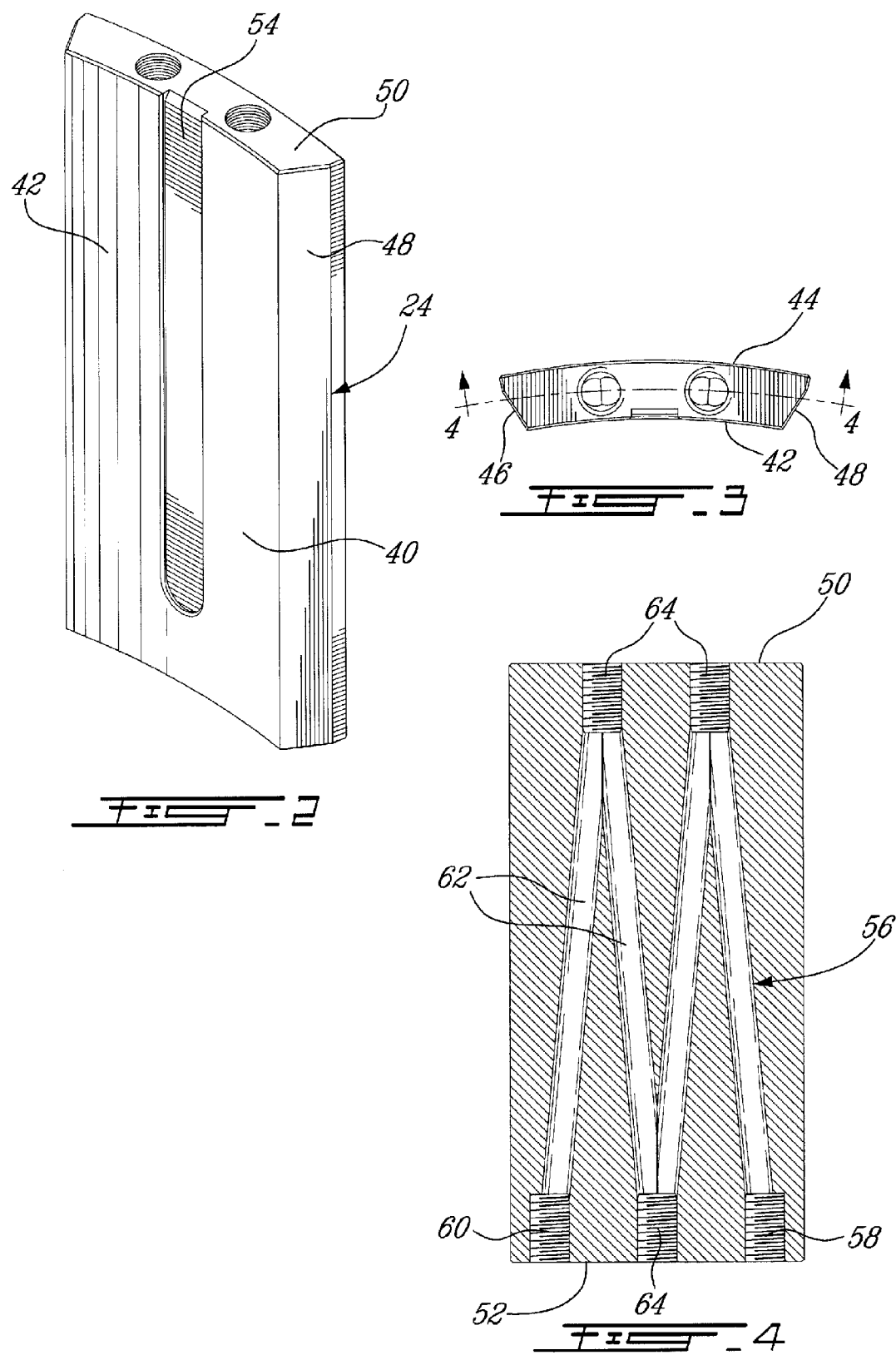

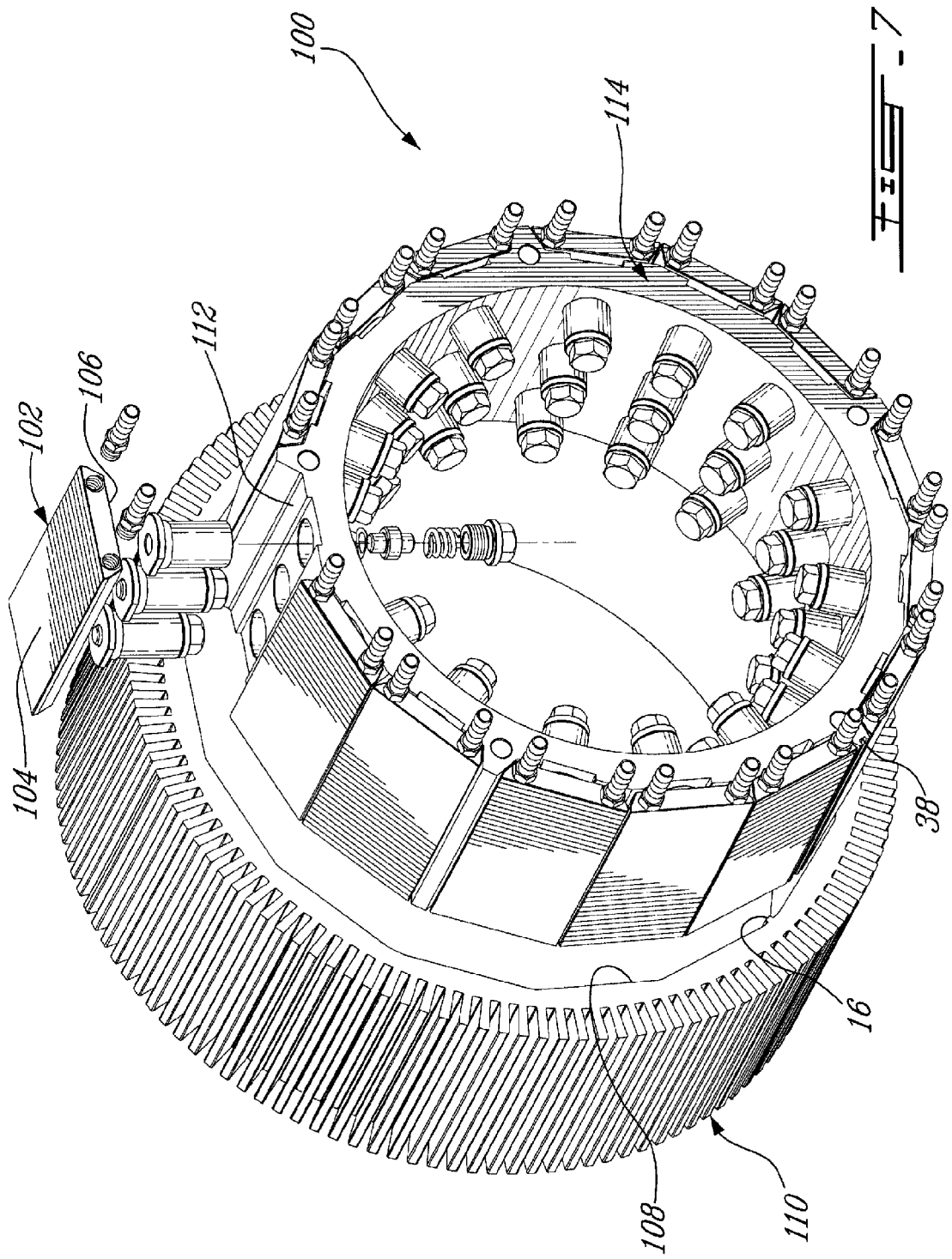

COOLING ASSEMBLY FOR LARGE DIAMETER ELECTRIC MACHINES

FIELD

The present invention generally relates to electric machines. More specifically, the present invention is concerned with cooling assemblies for electric machines having a large diameter.

BACKGROUND

Electric machines are well known in the art. They usually have a fixed stator and a rotating rotor. Generally the stator is external and the rotor is rotatably mounted inside the stator, coaxially therewith.

In some electric machines, the stator is internal and the cylindrical rotor is coaxially mounted outside the stator. These machines will be referred herein as internal stator electric machines.

Cooling internal stator machines is a challenge since one cannot rely on the air surrounding the stator as a cooling medium. Indeed, it is well known that heat is mainly generated inside the stator of an electric machine. When the stator is external, fins may be added to the machine casing and the machine may be cooled by convection. However, when the stator is surrounded by the rotor, convection cooling may not take place and heat must be extracted from the internal stator.

BRIEF DESCRIPTION OF THE DRAWINGS

In the appended drawings:

FIG. 1 is an exploded perspective view of a cooling assembly according to a first illustrative embodiment of the present invention;

FIG. 2 is a perspective view of a cooling element of the cooling assembly of FIG. 1;

FIG. 3 is a top plan view of the cooling element of FIG. 2;

FIG. 4 is a sectional view taken along line 4-4 of FIG. 3;

FIG. 7 is an exploded perspective view of a cooling assembly according to a second illustrative embodiment of the present invention;

DETAILED DESCRIPTION

Figure 6:
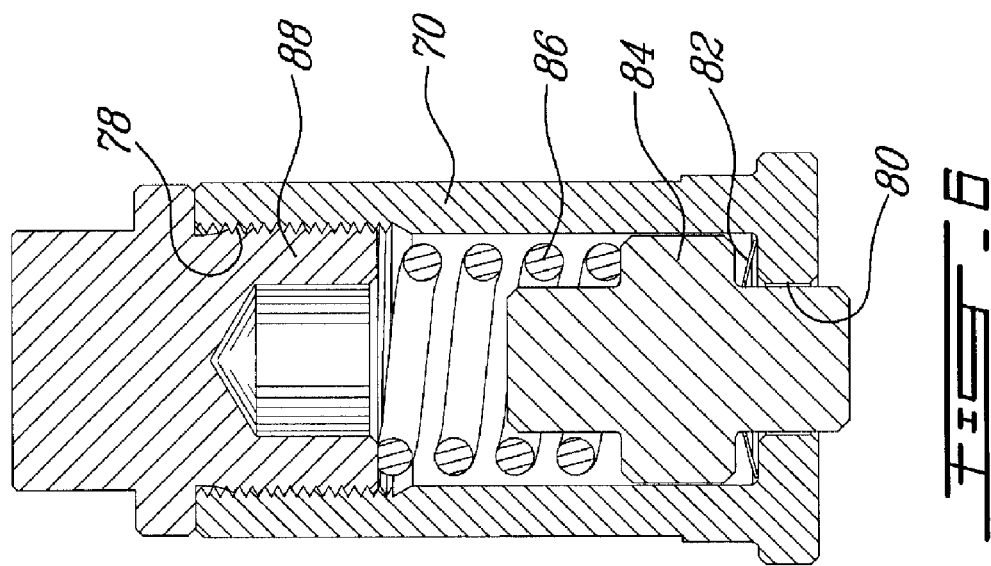
FIG. 6 is a sectional view taken along line 6-6 of FIG. 5.

In accordance with an illustrative embodiment of the present invention, there is provided a cooling assembly to be inserted inside the stator of an internal stator electric machine, the internal stator including an inner surface; the cooling assembly comprising:

a generally cylindrical support structure provided with an outer surface provided with at least two longitudinal channels;

at least two cooling elements each provided with an outer surface; each cooling element being configured and sized as to be inserted in a corresponding longitudinal channel of the support structure; each cooling element including a cooling channel provided with an inlet and an outlet; and at least two biasing assemblies respectively mounted to a longitudinal channel of the support structure so as to bias the outer surface of a cooling element to the inner surface of the internal stator.

According to another aspect of the present invention, there is provided a cooling assembly to be inserted inside the stator of an internal stator electric machine, the internal stator including an inner surface; the cooling assembly comprising:

a generally cylindrical support structure provided with an outer surface provided with a predetermined number of longitudinal channels;

a predetermined number of cooling elements each provided with an outer surface corresponding to the inner surface of the internal stator; each cooling element being configured and sized as to be inserted in a respective longitudinal channel of the support structure; each cooling element including a cooling channel provided with an inlet and an outlet; and each longitudinal channel of the support structure being provided with at least two biasing assemblies so mounted thereto as to bias the outer surface of the respective cooling element to the inner surface of the internal stator.

It is to be noted that the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Other objects, advantages and features of the present invention will become more apparent upon reading of the following non-restrictive description of illustrative embodiments thereof, given by way of example only with reference to the accompanying drawings.

Generally stated, illustrative embodiments of the present invention are concerned with a cooling assembly to be positioned inside an internal stator of an electric machine. The cooling assembly includes a plurality of cooling segments that may be so mounted to a support structure as to be biased towards an inner surface of the stator. The cooling segments include cooling channels provided between a cooling fluid input and a cooling fluid output. The cooling fluid input and output of the cooling segments are configured to be fluidly connected to cooling fluid input and output of adjacent cooling segments to define a continuous cooling channel.

Turning not to FIG. 1 of the appended drawings a cooling assembly 10 according to a first illustrative embodiment of the present invention will be described. The cooling assembly 10 is so configured and sized as to be inserted in an internal stator 12 provided with an inner surface 14 having a key 16.

The cooling assembly 10 includes a support structure 18 having a generally cylindrical inner surface 20 and a generally cylindrical outer surface 22, a plurality of cooling segments 24 and a plurality of biasing assemblies 26.

The support structure 18 is so configured as to be coaxially and slidably inserted inside the internal stator 12. Accordingly, the outer surface 22 of the structure 18 and the inner surface 14 of the stator 12 are similarly sized to prevent relative movements between these parts. The outer surface 22 further includes a plurality of longitudinal channels 28 each designed to receive three biasing assemblies 26 therein. The channels 28 are defined by angled side walls 30 and a relatively cylindrical bottom wall 32. A rectangular smaller channel 34 is provided in the bottom wall 32 of each channel 28.

Three apertures 36 are provided in the bottom wall of the smaller channel 34. These apertures 36 are configured and sized as to receive a respective biasing assembly 26 as will be described hereinbelow.

The support structure 18 is provided with a keyway 38 provided on the outer surface 22 thereof. The keyway 38 is configured and sized as to receive the key 16 to prevent the rotation of the cooling assembly 10 in the stator 12.

The support structure 18 is also provided with apertures 39 designed to receive fasteners (not shown) used to mount the structure 18 to the body of the electric machine (not shown), thereby mounting the stator 12 to the body of the electric machine.

Turning now to FIGS. 2 to 4 of the appended drawings, a cooling segment 24 will be described. The cooling segment 24 includes a machined body 40 having a curved inner surface 42, a curved outer surface 44, angled side walls 46 and 48, a top surface 50 and a bottom surface 52. The top and bottom surfaces 50 and 52 being longitudinally spaced apart.

The curve of the inner surface 42 is so determined as to approximately match the curve of the bottom wall 32 of the channels 30 and includes a channel 54 configured to receive a portion of the biasing assemblies 26 therein as will be described hereinbelow.

The curve of the outer surface 44 is so determined as to generally match the inner surface 14 of the stator 12 to thereby provide a good contact between these two surfaces.

The side walls 46 and 48 are so angled as to fit the angle walls 30 of the channels 28.

The segment 24 includes a cooling channel 56 provided with a fluid inlet 58 and a fluid outlet 60. The cooling channel 56 is defined by four angled bores 62 generally defining a W-shape as can be seen from FIG. 4. Straight bores 64 are provided on the top and bottom surfaces 50, 52 to allow connectors 66 and deformable taper plugs 68 (see FIG. 1) to be mounted thereto.

As can be better seen from FIG. 1, connectors 66 are used to interconnect the fluid inlet 58 and outlet 60 of one cooling segment 24 to adjacent cooling segments 24 using flexible tubes (not shown) or shaped rigid tubes (also not shown).

The deformable tapered plugs 68 are used to close the intersections of the angled bores 62 to create a continuous cooling channel 56 in the cooling segment 24. Tapered plugs are well known in the art and will not be described in detail herein. They are provided with pipe threads that seal the aperture. Or course, other types of plugs could be used to close these intersections.

Figure 5:
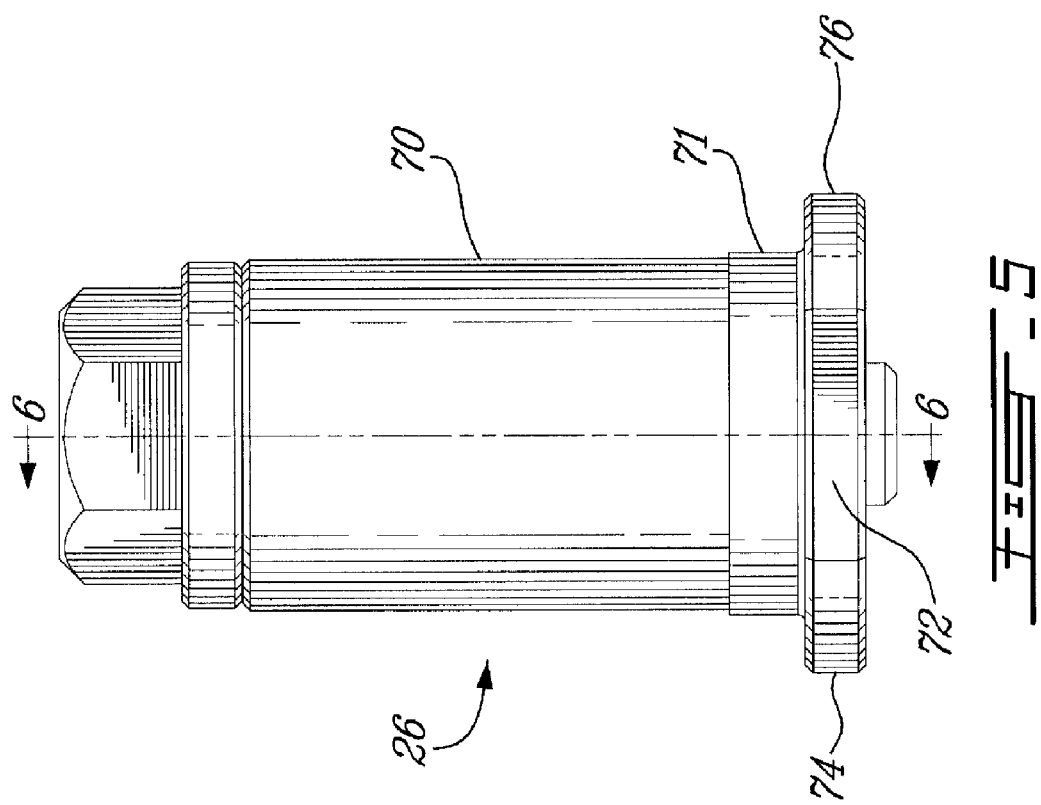
FIG. 5 is a side elevation view of a fastening element of the cooling assembly of FIG. 1.

Turning now to FIGS. 5 and 6 of the appended drawings, a biasing assembly 26 will be described.

The biasing assembly 26 includes a generally cylindrical body 70 configured and sized as to enter the apertures 36 of the support structure 18, and including a flange 72 provided with opposite sides 74, 76 so configured as to be inserted between the side walls of the channel 34. The body 70 includes an enlarged cylindrical portion 71 that is configured and sized as to be tight fitted in one of the apertures 36 of the support structure 18.

As can be better seen from FIG. 6, the cylindrical body 70 is hollow and includes a large threaded top opening 78 and a smaller bottom opening 80. A spring washer 82, a cross-shaped biasing element 84, a compression spring 86 and a fastener 88 are sequentially inserted in the body 70 via the top opening 78. Accordingly, when the fastener 88 is threaded in the threaded opening 78, the biasing element 84 will be forced out by the compression spring 86 as illustrated in FIG. 6. The spring washer 82 is used to ensure that when the fastener 88 is loosen, the biasing element 84 does not protrude from the apertures 36 of the support structure 18, therefore enabling the removal and/or installation of the cooling segments 24.

The compression spring 86 is so chosen that when the fastener 88 is fully tightened, the outwardly directed pressure is adequate to place in contact the cooling segment 24 and the stator 12 for an adequate heat transfer therebetween.

It will be understood by one skilled in the art that by pushing on the biasing element 84 via a compression spring 86, it is possible that the biasing element 84 is partially or totally pushed back in the body 70 should the external force be stronger than the compression force developed by the spring 86. This is interesting in the present application as will be described hereinbelow.

Returning to FIG. 1, as can be seen from the exploded portion, the biasing assemblies 26 are inserted in the apertures 36 before the cooling segments 24 are mounted to the channels 28.

More specifically, to assemble the cooling assembly 10 to the stator 12, one first inserts the biasing assemblies 26 in the apertures 36. The biasing assemblies are maintained in the apertures 36 by the interference between the enlarged portions 71 (see FIG. 5) and the wall of the aperture 36.

The support structure 18 is then inserted inside the stator 12 so that the key 16 enters the keyway 38. Once the insertion of the support structure 18 in the stator 12 is completed, the cooling segments may be inserted in channels 28, i.e. between the inner surface 14 of the stator and the bottom surface 32 of the channels 28. The fasteners 88 of the corresponding fastening assemblies 26 may be fully tightened to thereby apply a force that applies the outer surface 44 to the inner surface 14. Finally, when all the cooling segments 24 are mounted, conduits (not shown) may be used to interconnect the cooling inlets and outlets.

Of course, one of the segment's inlet is not connected to the adjacent segment outlet so as to provide both inlet and outlet for the entire cooling assembly 10.

One skilled in the art will understand that the support structure, the cooling elements and the other elements of the cooling assembly 10 may be made of heat conducting material so as to act as a heat sink.

Figure 8:
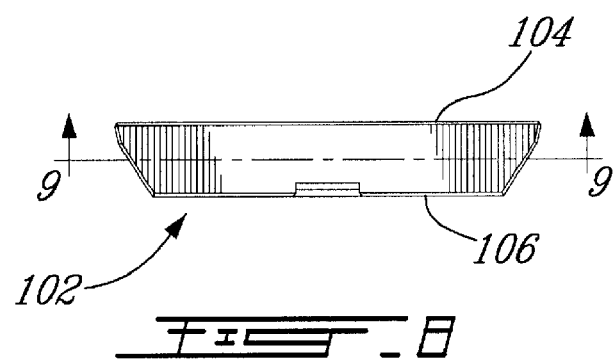
FIG. 8 is a top plan view of the cooling element of FIG. 7.
Figure 9:
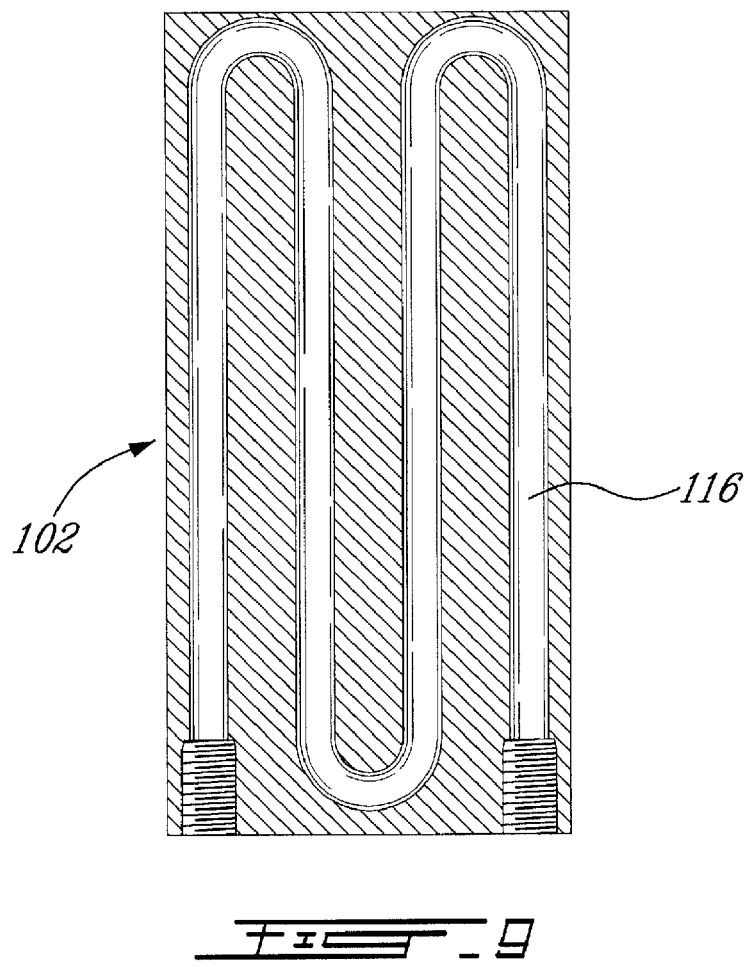
FIG. 9 is a sectional view taken along line 9-9 of FIG. 8.

Turning now to FIGS. 7 to 9, a cooling assembly 100 according to a second illustrative embodiment of the present invention will be described. It is to be noted that since the cooling assembly 100 is very similar to the cooling assembly 10 illustrated in FIGS. 1 to 6 and described hereinabove, only the differences between these cooling assemblies will be described hereinbelow for concision purposes.

Generally stated the major difference between the cooling assembly 100 and the cooling assembly 10 regards the shape of the cooling segments and the corresponding shape of the stator.

As can be seen from FIGS. 7 to 9, the cooling segments 102 include a flat outer surface 104 and a flat inner surface 106. Accordingly, the inner surface 108 of the stator 110 is adequately faceted to receive the flat outer surfaces 104 of the cooling segments. Similarly, the bottom wall 112 of the support structure 114 is flat to receive the inner surfaces 106 of the cooling segments 102.

Of course the key 16 and keyway 38 elements are so positioned as to align the segments 104 and the facets of the inner surface 108.

Another difference between the cooling assembly 100 and the cooling assembly 10 regards the cooling path in the individual cooling segments. Indeed, as can be seen from FIG. 9, a tube 116 is molded in or otherwise formed into the material of the cooling segment 102. This arrangement minimizes the risks of the cooling fluid leaking. The tube 116 is made of heat conducting material such as, for example, copper and stainless steel.

The above described illustrative embodiments provide many advantages. For example, it is possible to remove a defective cooling segment without removing the entire cooling assembly. Thermal dilatation and/or contraction of the materials of the cooling assembly and of the stator are compensated by the variable biasing action of the compression spring, enabling an adequate contact between the stator and the cooling segments at all time.

It is also to be noted that the assembly of the cooling assembly inside the stator is done solely by the radial forces developed by the biasing assemblies. Accordingly, no other element is required to interconnect these elements.

One skilled in the art will easily understand that the above described illustrative embodiments have been given as examples only and that many modifications could be done to these illustrative embodiments while retaining the advantages of the present invention. Examples of these modifications include:
- The number of biasing assemblies 26 could be different from illustrated;
- Other types of biasing assemblies could be used;
- The channel 54 is optional;
- The number of cooling segments could be different from illustrated;
- Other types of closing elements could be used instead of the plugs 68;
- The features of the different illustrative embodiments described hereinabove could be combined;
- Heat transfer grease could be provided between the outer surface of the cooling segments and the inner surface of the stator to improve the heat transfer from the stator to the cooling assembly; and
- The interconnection between the cooling segments could be done so as to create more than one cooling path so as to allow one cooling channel to be serviced while the other cooling channel(s) is/are still operational.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A cooling assembly to be inserted inside the stator of an internal stator electric machine, the internal stator including an inner surface; the cooling assembly comprising:
   a generally cylindrical support structure provided with an outer surface provided with at least two longitudinal channels;
   at least two cooling elements each provided with an outer surface; each cooling element being configured and sized as to be inserted in a corresponding longitudinal channel of the support structure; each cooling element including a cooling channel provided with an inlet and an outlet; and
   at least two biasing assemblies respectively mounted to a longitudinal channel of the support structure so as to bias the outer surface of a cooling element to the inner surface of the internal stator.

2. The cooling assembly recited in claim 1, wherein the inner surface of the internal stator is generally cylindrical and wherein the outer surface of each cooling element is so curved as to fit the cylindrical inner surface of the internal stator.

3. The cooling assembly recited in claim 1, wherein the inner surface of the internal stator has generally flat portions and wherein the outer surface of each cooling element is flat to fit the generally flat portions of the inner surface of the internal stator.

4. The cooling assembly recited in claim 1, wherein the inner surface of the stator includes a key and wherein the outer surface of the support structure includes a corresponding keyway.

5. The cooling assembly recited in claim 1, wherein each of the at least two longitudinal channels of the support structure is defined by angled side walls and a bottom wall; a rectangular channel is provided in the bottom wall of each longitudinal channel and at least one aperture is provided in the rectangular channel to receive one of the at least two biasing assemblies.

6. The cooling assembly recited in claim 1, wherein each cooling element includes top and bottom surfaces longitudinally spaced apart; the cooling channel of each cooling element is defined by four angled bores, made in the top and bottom surfaces and generally defining a W-shape.

7. The cooling assembly recited in claim 6, wherein each cooling element further includes straight bores on the top and bottom surfaces so configured to allow connectors and deformable taper plugs to be mounted thereto to complete the cooling channel.

8. The cooling assembly recited in claim 1, wherein each cooling element includes an embedded tube forming the cooling channel.

9. The cooling assembly recited in claim 8, wherein the embedded tube is made of heat conducting material.

10. The cooling assembly recited in claim 1, wherein the at least two cooling element are made of heat conducting material.

11. The cooling assembly recited in claim 1, wherein the generally cylindrical support is made of heat conducting material.

12. The cooling assembly recited in claim 5, wherein each at least two biasing assemblies includes:
   a generally hollow cylindrical body provided with an enlarged cylindrical portion configured and sized as to be fitted in one of the at least one aperture of the channel of the support structure; the cylindrical body including a large threaded opening at a first end and a smaller opening at an opposite second end;
   a spring washer, a cross-shaped biasing element, a compression spring and a fastener, sequentially inserted in the body via the top opening.

13. A cooling assembly to be inserted inside the stator of an internal stator electric machine, the internal stator including an inner surface; the cooling assembly comprising:
   a generally cylindrical support structure provided with an outer surface provided with a predetermined number of longitudinal channels;
   a predetermined number of cooling elements each provided with an outer surface corresponding to the inner surface of the internal stator; each cooling element being configured and sized as to be inserted in a respective longitudinal channel of the support structure; each cooling element including a cooling channel provided with an inlet and an outlet; and
   each longitudinal channel of the support structure being provided with at least two biasing assemblies so mounted thereto as to bias the outer surface of the respective cooling element to the inner surface of the internal stator.

* * * * *